March 17, 1931.  A. CARLSON  1,796,590
FISH LURE
Filed Feb. 18, 1930

Inventor
Axel Carlson

By Clarence A. O'Brien
Attorney

Patented Mar. 17, 1931

1,796,590

UNITED STATES PATENT OFFICE

AXEL CARLSON, OF SEATTLE, WASHINGTON

FISH LURE

Application filed February 18, 1930. Serial No. 429,314.

This invention relates to fishing accessories and has more particular reference to a fishing lure or spoon of the rotating or spinning type.

The invention is expressly designed for salmon fishing. In this connection it is to be stated that careful study shows that salmon has a habit of feeding on small herring. It is generally difficult however, for the relatively large salmon fish to catch and devour one of these small herring when the latter is alone. When however, there are several of these, or a small school, the salmon has little trouble in that he dives under and comes up with his nose below them and in that way sure of a catch.

In carrying the present inventive conception into effect, I have developed a simple and expedient luring spoon constructed to produce deceptive actions to attract salmon and in fact to provide an artificial bait for effective fishing.

The specific details which characterize and distinguish this improved appurtenance will become more readily apparent from the following description and drawings.

Figure 1:
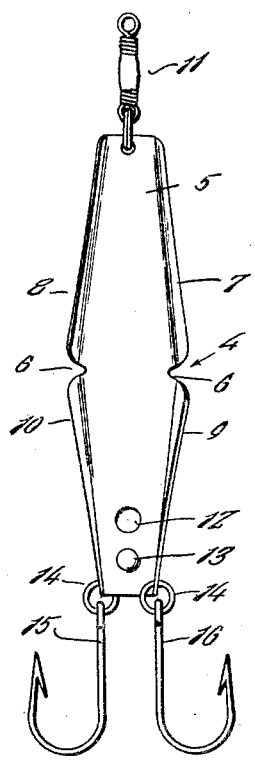
Figure 1 is a plan view of a lure or spoon constructed in accordance with the present invention.
Figure 2:
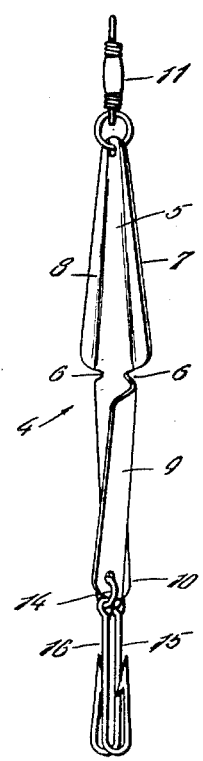
Figure 2 is an edge elevation of the same.
Figure 3:
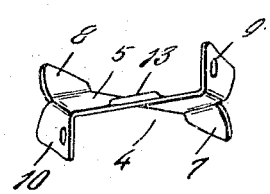
Figure 3 is an end view thereof with the hooks removed.

The body portion of the appliance is generally designated by the reference character 4. It is formed of sheet metal having a brilliant nickel-plated or highly polished brass finish so that the opposite sides thereof constitute reflectors for projecting confusing light rays in the water. The body portion of the sheet is designated by the numeral 5 and it is of elongated design and tapered toward the opposite outer end. In other words, it is wide at the center and tapered at opposite directions toward the ends.

Along the longitudinal edges, the plate is provided with laterally bent flanges which represent fins or lips. There are four of these and they are separated at their inner ends by substantially V-shaped notches represented at 6. At one end, the fins are distinguished by the reference characters 7 and 8 respectively. The flange 8 is bent in a direction opposite to that of the flange 7. At the opposite end are similar fins 9 and 10.

The flange 9 is bent in a direction opposite to the flange 10 with respect to the body portion 5. Thus, on each longitudinal edge I provide a pair of fins, for example, the fins 7 and 8, and these are bent in the directions opposite to each other also. In this way, the fins provide desired baffles for causing the body of the structure to turn around the swivel connector 11.

At the tail end is a waterhole 12, and a shallow cup formed by an upwardly pressed depression 13. This is located close to the hole. The action of the water swishing through the hole and pocketing in this cup 13 has a tendency to steady the body and prevent undue twisting and spinning in the water, especially as the device is being pulled along in comparatively smooth water.

At the tail end I provide rings 14 which carry a pair of hooks 15 and 16 respectively. It will be observed that the spoon rotates around the swivel 11 and this rotary action is produced by the opposite bending of the fins or flanges 7 to 10 inclusive. The spoon is permitted to literally swim in the water when properly manipulated through appropriate action of the fishing line (not shown).

A peculiar action is produced by the pressure of the water which is forced through the hole 12 striking the indentation or cup 13 and holding the spoon substantially level or straight so to speak, and causing the spoon not to foul. The provision of a pair of swingable hooks on the tail end of the appliance gives the fish a better chance to strike. The spoons may be made in different sizes and nickel-coated or formed of bronze, brass or the like. Moreover, the hooks need not necessarily be at the end, but may be arranged intermediate or on the opposite side edges.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. A fishing spoon comprising a plate having two pairs of laterally bent flanges on its longitudinal edges, there being a forward pair and a rearward pair, said flanges functioning as fins, the fins of the front pair being bent in directions opposite to each other, and the fins of the rear pair being bent in directions opposite to each other, the adjacent ends of the respective pairs being spaced from each other.

2. As a new product of manufacture, a fishing spoon comprising substantially flat elongated plate decreased in width toward its opposite ends and formed of reflecting material, the forward end portion being formed with a pair of longitudinal laterally bent flanges, said flanges being bent in a direction opposite to each other, the rear tail portion being formed with a pair of flanges, said second named flanges being bent in directions opposite to each other, said tail portion having a waterhole and an indentation adjacent said waterhole, a swivel connector fastened to the forward end of the plate, and a fishhook connected with the terminal portion of the tail end of said plate.

In testimony whereof I affix my signature.

AXEL CARLSON.